UNITED STATES PATENT OFFICE.

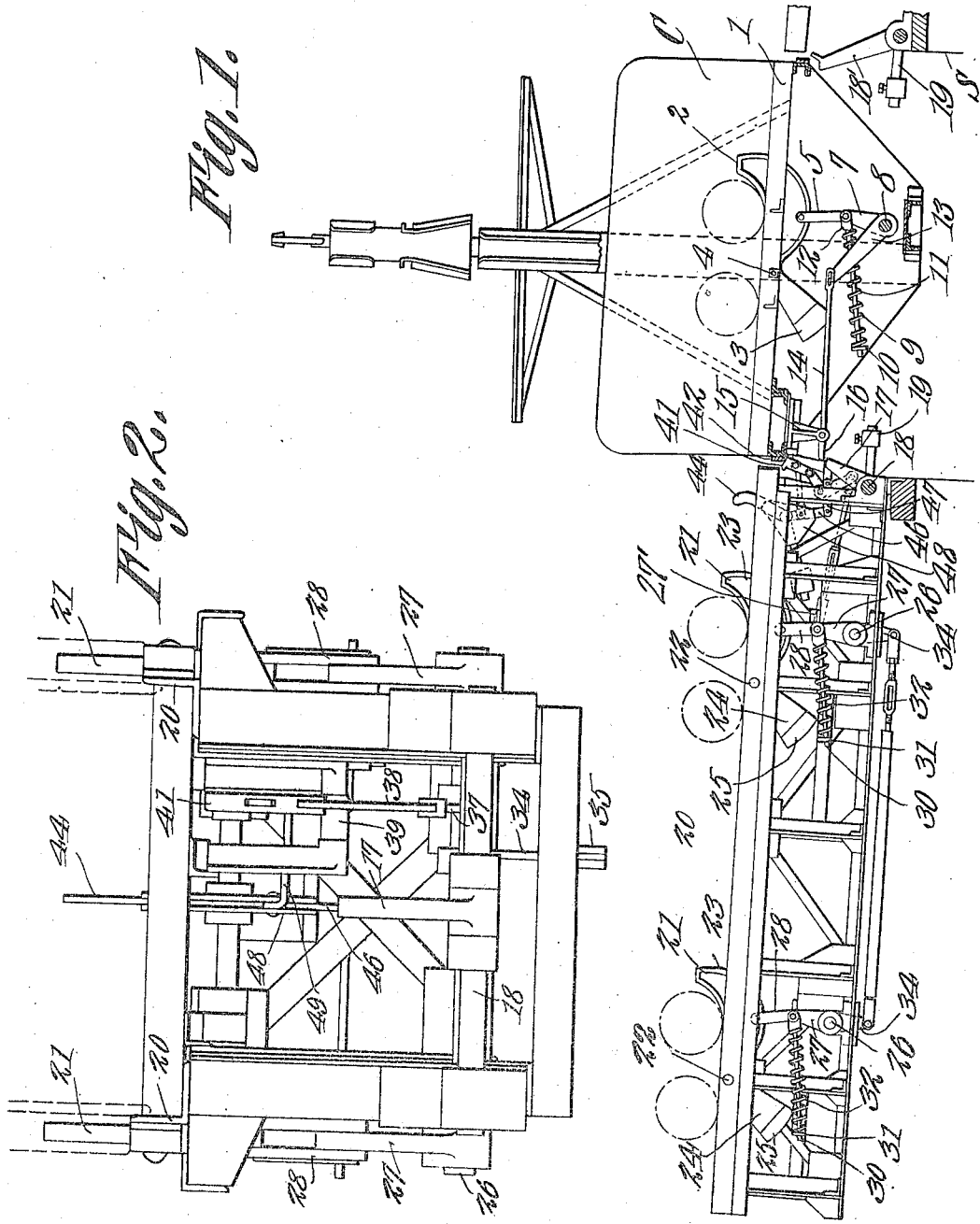
D. F. LEPLEY.
AUTOMATIC CAGING APPARATUS.
APPLICATION FILED JULY 24, 1915.
1,233,070.
Patented July 10, 1917.
2 SHEETS—SHEET 1.
Witnesses
D. F. Lepley
Inventor,
by
Attorneys.

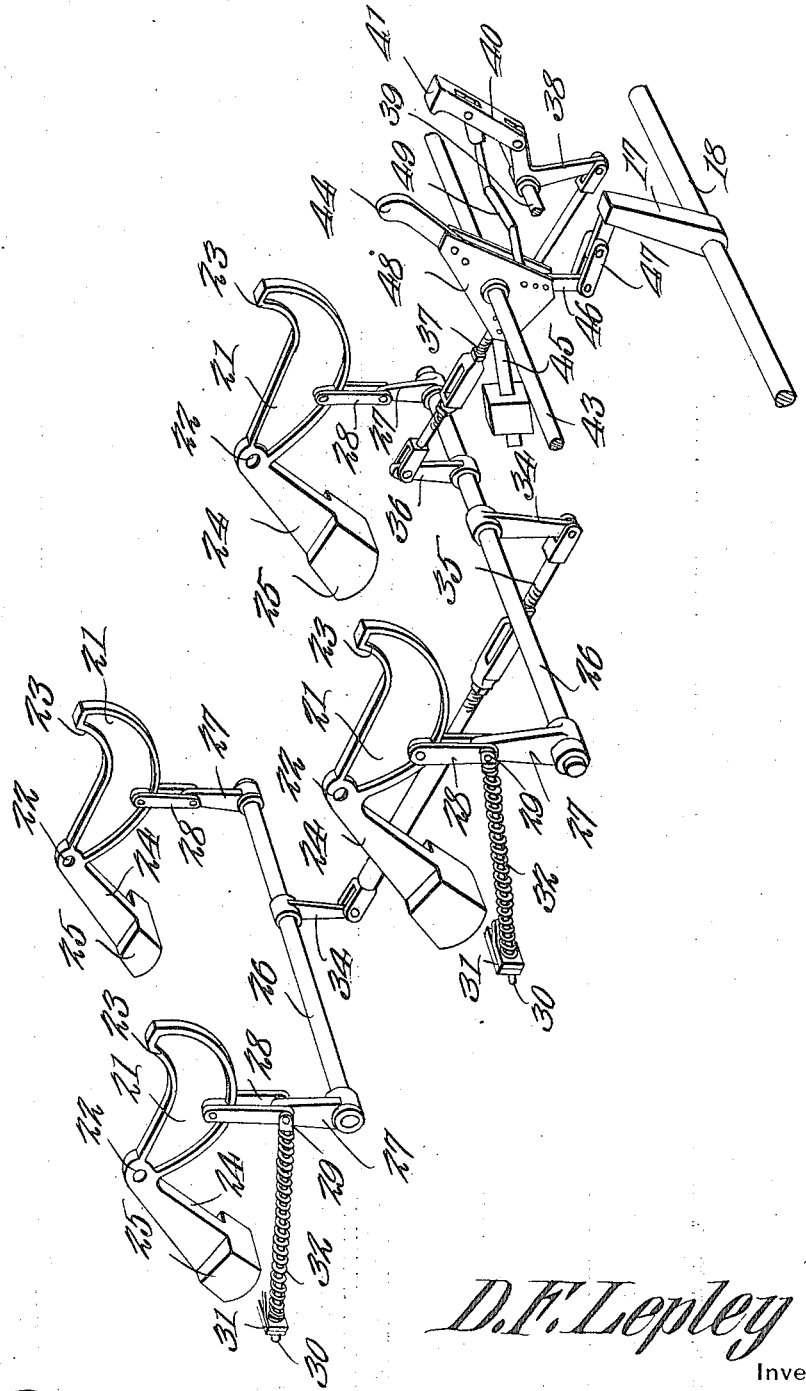

DANIEL F. LEPLEY, OF CONNELLSVILLE, PENNSYLVANIA.

AUTOMATIC CAGING APPARATUS.

1,233,070.

Specification of Letters Patent.

Patented July 10, 1917.

Application filed July 24, 1915. Serial No. 41,781.

*To all whom it may concern:*

Be it known that I, DANIEL F. LEPLEY, a citizen of the United States, residing at Connellsville, in the county of Fayette and State of Pennsylvania, have invented a new and useful Automatic Caging Apparatus, of which the following is a specification.

This invention relates to automatic caging apparatus especially designed for use in connection with a cage of that type shown, for example, in an application for United States Letters Patent filed by me on December 3, 1914, Serial No. 875,351.

One of the objects of the invention is to provide the inclined track adjacent the cage shaft, with means whereby two or more cars may be held in properly spaced relation, said means adapted to be released when the platform of the cage is brought into alinement with the incline, whereupon the cars will be automatically released to allow the first one to travel onto the platform and to allow the remaining cars to move up one position ready to be directed onto the cage in proper turn.

A further object is to provide car controlling mechanism which is entirely automatic, and which, when the cage is landed, operates to release three cars simultaneously, one car being on the cage and two cars on the adjacent caging apparatus.

Another object is to provide mechanism of this character especially designed to be used in connection with a car holding and releasing attachment on the cage platform, the parts coöperating to release the car on the platform so that it can gravitate therefrom while another car is being released to move onto the cage platform.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of an incline having the present improvements combined therewith, a cage being shown in position just prior to releasing the car holding means carried by the cage and incline, certain of the parts being shown in section.

Fig. 2 is an enlarged end elevation of the incline and the parts carried thereby, said parts being viewed from the cage shaft.

Fig. 3 is a perspective view of the mechanism carried by the incline.

Referring to the figures by characters of reference S designates the shaft in which a cage indicated generally at C is adapted to travel. The platform 1 of this cage is inclined and projecting through the platform are dogs, one of which has been indicated at 2, each dog being provided with an extension 3 constituting a weight, the dog being pivotally mounted as at 4. A link 5 connects dog 2 to an arm 7 extending from a shaft 8, this link and arm forming a toggle. In order that the arm 7 and link 5 may be held normally in the position illustrated in Fig. 1, a rod 9 is pivotally connected to arm 7 and is slidably mounted in a guide 10. A spring 11 is mounted on the rod and bears at one end against the guide 10 and at its other end against a fork 12 upon that end of the rod engaging arm 7. This spring thus exerts a constant thrust against arm 7.

An arm 13 is secured to shaft 8 and is pivotally and slidably connected to one end of a lever 14 fulcrumed in a bracket 15 depending from the platform 1 and the short arm 16 of this lever is designed, during the upward and downward movement of the cage, to engage a latch member 17 in the form of an arm which is secured to a shaft 18. This shaft is mounted for rotation close to one side of the shaft S.

Opposed pairs of dogs indicated at 18' may be provided, said dogs having weighted arms 19 for holding them normally in position to limit the downward movement of the cage C.

The parts hereinbefore described, with the exception of the rod 9, guide 10 and spring 11, have all been shown and described in detail in my application hereinbefore mentioned and, in themselves, constitute no part of the present invention. The present invention resides primarily in the incline 20 over which the cars pass to the platform 1 of the cage and in the means employed for holding the cars in properly spaced relation on the incline and for automatically releasing them when the cage is brought to position to receive one of the cars.

As shown in the drawings pairs of dogs 21 are arranged close to the rails on the incline, these dogs being pivotally mounted as at 22 and having upturned noses 23 adapted to extend in front of the front wheels of the cars, when in their normal positions, thus to hold the cars against movement down the incline. Each dog has an arm 24 provided with a weight 25 whereby it is held normally with its nose 23 projected upwardly into active position. Extending transversely under the dogs of each pair is a shaft 26 having arms 27 connected by links 28 to the dogs forming toggles. The forked end 29 of a rod 30 is attached to one of the arms 27 on each shaft at its point of connection with the links 28 and each of these rods is slidably mounted in a guide 31 and has a spring 32 thereon bearing at one end against the guide and at its other end against the forked end 29, thus to hold the links and arms normally in the position shown in Figs. 4 and 5, at which time the dogs are projected upwardly to active positions, and the links 27 and 28 are pressed forwardly past their dead centers and against stops 27'. With the parts thus positioned the dogs are locked and cannot be lowered until the shafts 26 are rotated.

Each of the shafts 26 has a depending arm 34 and a rod 35 connects these arms so that the shafts are thus caused to rotate in unison. Another arm 36 extends upwardly from that shaft 26 nearest the cage shaft S and this arm 36 is connected by a rod 37 to one arm of a bell crank lever 38 fulcrumed on a shaft 39. The other or upper arm of the bell crank lever 38 is pivotally connected to a dog 40 the upper enlarged end 41 of which is adapted to project into the shaft S and into the path of a plate or extension 42 on the side of the cage C.

Mounted on a transverse shaft 43 under that portion of the incline adjacent the shaft S is an upwardly extending tripping arm 44 and a weighted arm 45 also extends from this shaft. Another arm 46 extends from said shaft and is connected by links 47 to the latch member 17. In order to reinforce the arms 44, 45 and 46, plates 48 are preferably riveted or otherwise secured to them, as shown. A rod 49 is pivotally mounted between the plates 48 close to the arm 46 and its upper or other end is pivotally connected to dog 40.

Assuming that cars are standing on the incline 20 and held in spaced relation by the pairs of dogs 21, when the cage C with a car thereon is elevated in the shaft S, it is brought to a point above the delivery end of the incline and is then lowered onto the dogs 18'. During this movement of the cage to position upon the regular landing dogs 18' a portion of the cage lands on dog 40, while the short arm of lever 14 lands on the top of the latch member 17. Lever 14 is thus swung upon its fulcrum point and by acting through the toggle releases the dogs 2 on the cage, while at the same time the cage depresses or lowers dog 40, thus rotating bell crank 38 and thrusting through rod 37 to kick back the toggles 27—28 and lower the dogs 21. Thus the cars on the cage and incline are released simultaneously. The rod 49 and the links 47 act simultaneously upon latches 40 and 17 to pull them from under the cage and lever 14 respectively, when the car that is moving on to the cage has traveled far enough to contact with lever 44, which acts to rotate the shaft upon which arms 46 and 49 are attached, and by this means bring about a simultaneous rising movement of all of the retaining dogs 2 and 21 on both the cage and the caging apparatus under the action of their springs. It will be seen that the car released from the incline will be free to travel onto the platform 1 and against the stop dog 2 while the car which formerly occupied the second position on the incline will roll down to the first position, ready to be directed onto the cage and the next operation. Upon the withdrawal of the dogs 18' from under the cage, said cage will be free to move downwardly with its load and, when again raised, the foregoing operation can be repeated.

What is claimed is:—

1. The combination with an incline and a cage movable across the end of the incline, of means upon the incline for holding cars in spaced relation, means for automatically locking said holding means in active positions, means operated by the movement of the cage to position at the end of the incline, for depressing all of the holding means simultaneously to releasing positions, and means operated by a released car while moving onto the cage from the incline, for simultaneously raising all of the holding means to their normal positions.

2. The combination with an incline and a cage movable across the end thereof, of means upon the incline for holding cars in spaced relation thereon, yieldingly held means for maintaining said holding means in active positions, means operated by the movement of the cage to position at the end of the incline for depressing all of said holding means simultaneously to inactive position, thereby to release the held cars, and means operated by the movement of a car from the incline and onto the cage for disengaging said shifting means from the cage and resetting the holding means.

3. The combination with an incline and a cage movable across the end thereof, of means on the incline for holding the cars in spaced relation and against movement along the incline, yielding means for locking the holding means in active positions, means operated by the movement of the cage to position at one end of the incline, for unlocking said holding means and shifting them to release the cars on the incline, a tripping arm projecting into the path of a car when moving from the incline onto the cage, and means operated by said arm for disengaging the unlocking means from the cage to permit automatic resetting of the holding means.

4. The combination with an incline, a cage movable across the end of the incline, car holding means carried by the cage, and means for locking said holding means in active position, of means upon the incline for holding a car against movement therealong, means for locking said holding means in active position on the incline, separate means operated by the movement of the cage into position at one end of the incline for successively unlocking and shifting the holding means on the cage and on the incline, respectively, and holding them in car releasing positions, a tripping arm upon the incline and adapted to be actuated by a released car passing from the incline onto the cage, means operated by said arm for automatically releasing the shifted car holding means from the control of the cage, and means for automatically elevating the released car holding means to their active positions.

5. The combination with an incline and a cage movable past one end of the incline, of dogs pivotally connected to the incline and constituting means for holding cars in spaced relation thereon, means connecting the dogs for causing the same to move in unison, a bell crank lever, means operated thereby for simultaneously shifting the dogs to inactive positions, a dog pivotally connected to the bell crank lever and adapted to be shifted by the movement of the cage relative to the incline, thereby to actuate the bell crank lever, a tripping arm, means for holding the tripping arm normally in active position for engagement by a released car, and means operated by the tripping arm under the action of the released car, for withdrawing the dog on the bell crank lever from engagement with its actuating means.

6. The combination with an incline and a cage movable past one end of the incline, of dogs pivotally connected to the incline and constituting means for holding cars in spaced relation thereon, means connecting the dogs for causing the same to move in unison, a bell crank lever, means operated thereby for simultaneously shifting the dogs to inactive positions, a dog pivotally connected to the bell crank lever and adapted to be shifted by the movement of the cage relative to the incline, thereby to actuate the bell crank lever, a tripping arm, means for holding the tripping arm normally in active position for engagement by a released car, and means operated by the tripping arm under the action of the released car, for withdrawing the dog on the bell crank lever from engagement with its actuating means, a latch member adjacent the end of the incline, a connection between said member and the tripping arm, car holding means upon the cage, a lever carried by the cage and coöperating with the latch member for shifting said car holding means on the cage out of active position, said trip arm constituting means when shifted by a car, to disengage the latch member from the lever.

7. The combination with an incline and a cage movable across the end thereof, of dogs upon the incline for holding a car against movement thereon, a shaft, arms extending from the shaft, link connections between the arms and the respective dogs, stops for engagement by said connections when past their dead centers, for locking the dogs in raised or active positions, means operated by the movement of the cage to position at the end of the incline for rotating the shaft and moving said connections away from the stops to depress the dogs to releasing positions, and means operated by a released car while moving onto the cage from the incline, for simultaneously raising all of the dogs to their normal or locked positions.

In testimony that I claim the foregoing as my own, I have hereto affixed my signature in the presence of two witnesses.

DANIEL F. LEPLEY.

Witnesses:
 EDITH HARRIS,
 ANNA R. THOMPSON.

Copies of this patent may be obtained for five cents each, by addressing the "Commissioner of Patents, Washington, D. C."